United States Patent
Taylor et al.

(10) Patent No.: US 9,158,761 B2
(45) Date of Patent: Oct. 13, 2015

(54) IDENTIFYING CULTURAL BACKGROUND FROM TEXT

(71) Applicant: LOCKHEED MARTIN CORPORATION, Bethesda, MD (US)

(72) Inventors: Sarah M. Taylor, Falls Church, VA (US); Daniel M. Davenport, Somerdale, NJ (US); David Menaker, Limerick, PA (US); Rosemary D. Paradis, Inlet, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 258 days.

(21) Appl. No.: 13/852,620

(22) Filed: Mar. 28, 2013

(65) Prior Publication Data

US 2013/0282362 A1 Oct. 24, 2013

Related U.S. Application Data

(60) Provisional application No. 61/616,685, filed on Mar. 28, 2012.

(51) Int. Cl.
*G06F 17/27* (2006.01)
*G06F 17/28* (2006.01)

(52) U.S. Cl.
CPC .............. *G06F 17/28* (2013.01); *G06F 17/274* (2013.01); *G06F 17/277* (2013.01)

(58) Field of Classification Search
CPC ........... G06Q 30/0241; G06Q 30/0251; G06F 17/2785; G06F 17/30864; G06F 17/274; G06F 17/30734; H04L 12/588; H04L 51/32
USPC ........... 704/3, 9, 8, 4; 715/752, 236; 709/224, 709/206, 204; 707/797, 758, 737; 706/52; 705/7.29, 14.53
IPC ............... G06Q 30/241,30/251; G06F 17/2785, G06F 17/30864, 17/274, 17/30734; H04L 12/58, 67/02
See application file for complete search history.

(56) References Cited

U.S. PATENT DOCUMENTS 5,963,205 A * 10/1999 Sotomayor .................... 715/236
6,243,713 B1 * 6/2001 Nelson et al. .......................... 1/1
7,930,302 B2 * 4/2011 Bandaru et al. ............... 707/737
8,468,011 B1 * 6/2013 Sites ................................. 704/8

(Continued)

OTHER PUBLICATIONS

Extended European Search Report issued Aug. 6, 2013 in Patent Application No. 13161708.6.

(Continued)

*Primary Examiner* — Michael Colucci
(74) *Attorney, Agent, or Firm* — Oblon, McClelland, Maier & Neustadt, L.L.P.

(57) ABSTRACT

Diaculture of text can be determined or analyzed by tokenizing words of the text according to a rule set to generate tokenized text, the rule set defining: a first set of grammatical types of words, which are words that are replaced with tokens that respectively indicate a grammatical type of a respective word, and a second set of grammatical types of words, which are words that are passed as tokens without changing. Grams can be constructed from the tokenized text, each gram including one or more of consecutive tokens from the tokenized text. The grams can be compared to a training data set that corresponds to a known diaculture to obtain a comparison result that indicates how well the text matches the training data set for the known diaculture.

18 Claims, 6 Drawing Sheets

(56) References Cited

U.S. PATENT DOCUMENTS

| | | | |
|---|---|---|---|
| 8,706,675 B1* | 4/2014 | Samaniego et al. | 706/52 |
| 2005/0080611 A1* | 4/2005 | Huang et al. | 704/4 |
| 2008/0249764 A1* | 10/2008 | Huang et al. | 704/9 |
| 2009/0222551 A1* | 9/2009 | Neely et al. | 709/224 |
| 2009/0271256 A1* | 10/2009 | Toebes et al. | 705/14 |
| 2010/0153411 A1* | 6/2010 | Toebes et al. | 707/758 |
| 2010/0191773 A1* | 7/2010 | Stefik et al. | 707/797 |
| 2011/0113032 A1* | 5/2011 | Boscolo et al. | 707/737 |
| 2011/0113096 A1* | 5/2011 | Long et al. | 709/204 |
| 2012/0042022 A1* | 2/2012 | Sheth et al. | 709/206 |
| 2012/0166180 A1* | 6/2012 | Au | 704/9 |
| 2012/0272160 A1* | 10/2012 | Spivack et al. | 715/752 |
| 2013/0253980 A1* | 9/2013 | Blom et al. | 705/7.29 |

OTHER PUBLICATIONS

Nikesh Garera, et al., "Modeling Latent Biographic Attributes in Conversational Genres" Proceedings of the 47th Annual Meeting of the ACL and the 4th International Joint Conference on Natural Language Processing of the AFNLP, vol. 2, XP055073474, Aug. 2009, pp. 710-718.

Delip Rao, et al., "Classifying Latent User Attributes in Twitter" Proceedings of the 2nd International Workshop on Search and Mining User-generated Contents, SMUC '10, XP055073492, Oct. 2010, pp. 37-44.

Giacomo Inches, et al., "Online conversation mining for author characterization and topic identification" Proceedings of the 4th Workshop on Workshop for Ph.D. Students in information and Knowledge Management, XP055073476, Oct. 2011, 9 pages.

Rosemary D. Paradis, et al., "Detection of Groups in Non-Structured Data" Procedia Computer Science, vol. 12, XP008163840, 2012, pp. 412-417.

M. Adams, "The Server's Lexicon: Preliminary Inquiries into Current Restaurant Jargon" American Speech, vol. 73, No. 1, 1998, pp. 57-83.

Matthew Gordon, et al., "Sex, Sound Symbolism, and Sociolinguistics" Current Anthropology, vol. 39, No. 4, 1998, 30 pages.

John J. Gumperz, "Linguistic and Social Interaction in Two Communities" American Anthropologist, New Series, vol. 66, No. 6, 1964, 18 pages.

Thomas Hofmann, "Probabilistic Latent Semantic Indexing" SIGIR '99 Proceedings of the 22nd Annual International ACM SIGIR Conference on Research and Development in Information Retrieval, 1999, 8 pages.

Judith A. Howard, "Social Psychology of Identities" Annual Review of Sociology, vol. 26, 2000, pp. 367-393.

Katherine D. Kinzler, et al., "The native language of social cognition" Proceedings of the National Academy of Sciences of the United States of America, vol. 104, No. 30, 2007, pp. 12577-12580.

Paul Lerman, "Argot, Symbolic Deviance and Subcultural Delinquency" American Sociological Review, vol. 32, No. 2, 1967, 17 pages.

David Minderhout, "Sociolinguistics and Anthropology" Anthropological Linguistics, vol. 16, No. 4, 1974, 10 pages.

Lee Pederson, "The Linguistic Atlas of the Gulf States: Interim Report Three" American Speech, vol. 51, No. 3/4, 1976, 8 pages.

Carol W. Pfaff, "Constraints on Language Mixing: Intrasentential Code-Switching and Borrowing in Spanish/English" Language, vol. 55, No. 2, 1979, 29 pages.

Sándor G. J. Hervey, "On the Penetrability of Speech Communities" La Linguistique, vol. 27, Fasc. 2, 1991, 20 pages.

Jaime Teevan, et al., "#TwitterSearch: A Comparison of Microblog Search and Web Search" WSDM '11 Proceedings of the Fourth ACM International Conference on Web Search and Data Mining, 2011, 10 pages.

James Diego Vigil, "Group Processes and Street Identity: Adolescent Chicano Gang Members" Ethos, vol. 16, No. 4, Dec 1988, 26 pages.

Walt Wolfram, et al., "Dialect and Special-Interest Domains: Conceptual and Methodological Issues in Collecting a Medical Lexicon" American Speech, vol. 67, No. 4, 1992, 16 pages.

* cited by examiner

FIG. 4

SOD RESULTS

PRINT | SAVE | NEW | MENU

NARCOTICS (LFF) | NARCOTICS (KEYWORDS) | NARCOTICS (M...)

| INDEX | POST | SCORE |
|---|---|---|
| 1 | narco_BorderReporter_5.txt | 1.000 |
| 2 | narco_BorderReporter_19... | 0.873 |
| 3 | narco_BorderReporter_33... | 0.629 |
| 4 | narco_BorderReporter_23... | 0.496 |
| 5 | narco_BorderReporter_29... | 0.489 |
| 6 | femRadical_ProFeminist_... | 0.081 |
| 7 | narco_BorderReporter_42... | 0.057 |
| 8 | narco_BorderReporter_41... | 0.056 |
| 9 | femRadical_BlamePatriar... | 0.048 |
| 10 | misc_Beggars_All_Refo... | 0.047 |
| 11 | misc_Inside_Minnesota_... | 0.046 |
| 12 | misc_Retrospace_7.txt | 0.045 |
| 13 | hacker_CyberOpSc_11.txt | 0.043 |
| 14 | femRadical_ProFeminist_... | 0.038 |
| 15 | narco_BorderReporter_24... | 0.036 |

NARCOTICS (LFF)

| INDEX | POST | SCORE |
|---|---|---|
| 1 | narco_BorderReporter_5... | 1.000 |
| 2 | narco_BorderReporter_1... | 0.873 |
| 3 | narco_BorderReporter_3... | 0.629 |
| 4 | narco_BorderReporter_2... | 0.496 |
| 5 | narco_BorderReporter_2... | 0.489 |
| 6 | femRadical_ProFeminist... | 0.081 |
| 7 | narco_BorderReporter_4... | 0.057 |
| 8 | narco_BorderReporter_4... | 0.056 |
| 9 | femRadical_BlamePatria... | 0.048 |
| 10 | misc_Beggars_All_Refo... | 0.047 |
| 11 | misc_Inside_Minnesota_... | 0.046 |
| 12 | misc_Retrospace_7.txt | 0.045 |
| 13 | hacker_CyberOpSc_11.txt | 0.043 |
| 14 | femRadical_ProFeminist... | 0.038 |
| 15 | narco_BorderReporter_2... | 0.036 |

| | | |
|---|---|---|
| 16 | misc_Inside_Minnesota_... | 0.036 |
| 17 | femRadical_BlamePatriar... | 0.035 |
| 18 | misc_AngryBlackBitch_31... | 0.035 |
| 19 | misc_Stroblst_22.txt | 0.034 |
| 20 | misc_Coast_Guard_All_H... | 0.034 |
| 21 | Misc_TEXAS_POLYGAMY... | 0.034 |
| 22 | misc_It_Might_Be_Dange... | 0.033 |
| 23 | misc_Stuff_Christians_LI | 0.033 |
| 24 | narco_BorderReporter_35... | 0.033 |
| 25 | narco_BorderReporter_38... | 0.033 |
| 26 | narco_BorderReporter_12... | 0.032 |
| 27 | openSource_GoogleOpSc... | 0.032 |
| 28 | muslimBrotherhood_MBH... | 0.032 |
| 29 | misc_Bronte_Capital_2.txt | 0.031 |
| 30 | hacker_CyberOpSc_194.txt | 0.030 |

| | | |
|---|---|---|
| 16 | misc_Inside_Minnesota_... | 0.036 |
| 17 | femRadical_BlamePatria... | 0.035 |
| 18 | misc_AngryBlackBitch_3... | 0.035 |
| 19 | misc_Stroblst_22.txt | 0.034 |
| 20 | misc_Coast_Guard_All_... | 0.034 |
| 21 | misc_TEXAS_POLYGAMY... | 0.034 |
| 22 | misc_It_Might_Be_Dang... | 0.033 |
| 23 | misc_Stuff_Christians_Li... | 0.033 |
| 24 | narco_BorderReporter_3... | 0.033 |
| 25 | narco_BorderReporter_3... | 0.033 |
| 26 | narco_BorderReporter_1... | 0.032 |
| 27 | openSource_GoogleOpS... | 0.032 |
| 28 | muslimBrotherhood_MB... | 0.032 |
| 29 | misc_Bronte_Capital_2.txt | 0.031 |
| 30 | hacker_CyberOpSc_194.txt | 0.030 |

FIG. 4 CONTINUED

IDENTIFYING CULTURAL BACKGROUND FROM TEXT

CROSS-REFERENCE TO RELATED APPLICATIONS

This application claims priority to and incorporates by reference the entirety of U.S. 61/616,685, filed Mar. 28, 2012.

BACKGROUND

Conventionally, if an analyst wishes to identify specific diaculture data streams, the analyst either uses hand selected keywords, or identifies hand selected communications channels. A standard search engine can be utilized to search for such keywords.

The analyst relies on his own ability to identify critical combinations of keywords or phrases. Skilled analysts can be very good at this, but it requires innate abilities and experience, and takes time.

SUMMARY

According to exemplary implementations, a method for determining a diaculture of text is provided. The method can be executed by one or more processors, circuits, computer hardware components, and can be distributed across a number of different machines.

The method can include tokenizing words of text with one or more processors according to a rule set to generate tokenized text. The rule set can define a first set of grammatical types of words, which are words that are replaced, in the tokenizing, with tokens that respectively indicate a grammatical type of a respective word. The rule set can also define a second set of grammatical types of words, which are words that are passed, in the tokenizing, as tokens without changing. Other rule sets can also be defined, which define words that are stopped or discarded.

Grams can be constructed from the tokenized text, each gram including one or more of consecutive tokens from the tokenized text. The grams can be compared to a training data set that corresponds to a known diaculture to obtain a comparison result that indicates how well the text matches the training data set for the known diaculture. The comparing can include assigning scores to the grams based on a comparison between the training data set and a baseline data set. The baseline data set can be much larger than the training data set.

A fixed number of the consecutive tokens in the tokenized text can be windowed to form a first window, and a process of repeatedly advancing the first window by one token to form a plurality of windows of tokens from the tokenized text can be followed. A score can be assigned to each of the windows based on the scores assigned to the grams. The comparison result can be obtained based on the scores assigned to the windows.

The constructing of grams can include constructing a plurality of 1, 2, and 3-grams from the tokenized text, the 1, 2, and 3 grams respectively including 1, 2, and 3 consecutive tokens from the tokenized text, such that a 1-gram includes a first token, a 2-gram includes the first token and a second token that consecutively follows the first token, and a 3-gram includes the first and second tokens and a third token that consecutively follows the first token.

The comparing can further includes assigning scores to the grams based on the training data set, including assigning a composite score for one gram that is calculated based on neighboring grams, such that the composite score for the 1-gram is calculated based on scores assigned to the first, second and third tokens. The composite score for the 1-gram can be an average of the scores assigned to the first, second and third tokens.

The first set of grammatical types of words can include words indicative of a topic of the text. The second set of grammatical types of words does not include words that are indicative of the topic of the text.

Topic-centric words can be replaced with tokens, whereas non-topic-centric words are focused on for determining a diaculture of text.

The first set of grammatical types of words can include verbs, nouns, adverbs, and adjectives. Each tense of each grammatical type in the first set can be tokenized with a different token.

The second set of grammatical types of words can include possessive pronouns, pronouns, articles, and prepositions.

The training data set can include a plurality of data sets that respectively correspond to a plurality of different diacultures, and the comparing can include comparing the grams to the data sets to obtain comparison results that indicate how well the text matches the data sets. A result of the comparing can be displayed on a display.

The training data set can include a plurality of comments written by authors of the known diaculture. The comments can include comments of a posting, where the training data set does not include the posting.

Training scores can be assigned to the training data set by: tokenizing words of the comments with one or more processors according to the rule set to generate tokenized comments; constructing grams from the tokenized comments, each gram including one or more of consecutive tokens from the tokenized comments; and assigning scores to each of the grams of the tokenizing comments according to one or more scoring methods that each define a relationship between a score of a gram, and a number of times the gram appears in the training data set and a baseline data set.

The comparing can include assigning scores to the grams of the tokenized text based on the scores assigned to the grams of the tokenized comments. A fixed number of the consecutive tokens can be windowed in the tokenized text to form a first window, where repeatedly advancing the first window by one token forms a plurality of windows of tokens from the tokenized text. Scores can be assigned to the windows based on the scores assigned to the grams. The comparison result can be obtained based on the scores assigned to the windows.

The training data set can include a plurality of data sets that respectively correspond to a plurality of different diacultures. The comparing can include comparing the grams to the data sets to obtain comparison results that indicate how well the text matches the data sets. Results of the comparing for each combination of the one or more scoring methods and the different diacultures can be displayed on a display.

A non-transitory computer readable medium including computer-executable instructions that, when executed by a computer processor, can cause the computer processor to execute the method.

A system for determining a diaculture of text can include computer hardware, such as a central processor and memory, which is configured to: tokenize words of the text with one or more processors according to a rule set to generate tokenized text, the rule set defining: a first set of grammatical types of words, which are words that are replaced with tokens that respectively indicate a grammatical type of a respective word, and a second set of grammatical types of words, which are words that are passed as tokens without changing. The system can construct grams from the tokenized text, each gram including one or more of consecutive tokens from the tokenized text, and compare the grams to a training data set that corresponds to a known diaculture to obtain a comparison result that indicates how well the text matches the training data set for the known diaculture.

A processing machine for determining a diaculture of text can include tokenizing circuitry to tokenize words of the text with one or more processors according to a rule set to generate tokenized text, the rule set defining: a first set of grammatical types of words, which are words that are replaced, by the tokenizing circuitry, with tokens that respectively indicate a grammatical type of a respective word, and a second set of grammatical types of words, which are words that are passed, by the tokenizing circuitry, as tokens without changing. The machine can further include constructing circuitry to construct grams from the tokenized text, each gram including one or more of consecutive tokens from the tokenized text, and comparing circuitry to compare the grams to a training data set that corresponds to a known diaculture to obtain a comparison result that indicates how well the text matches the training data set for the known diaculture.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIGS. 3-4 are exemplary screenshots of a user interface for a system to analyze diacultures of text.

DETAILED DESCRIPTION

Figure 1:
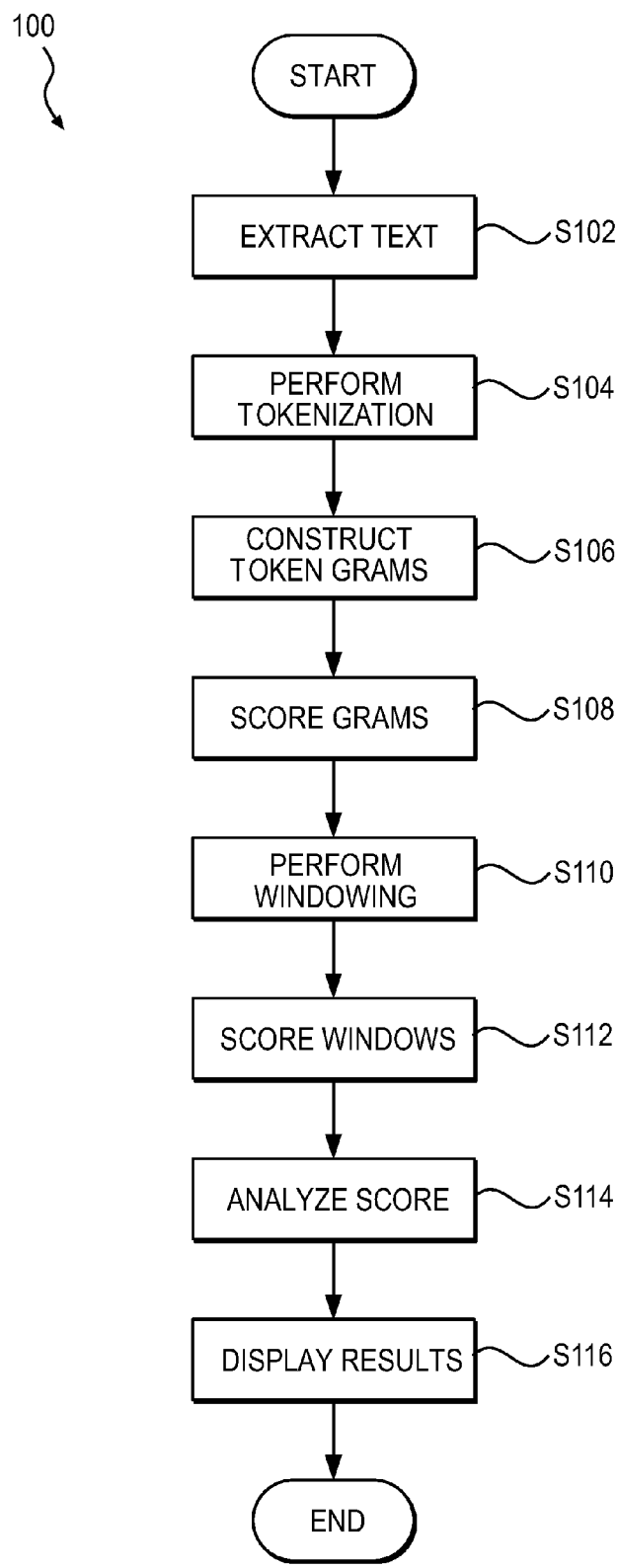
FIG. 1 illustrates an exemplary algorithm, by way of a flow chart, for analyzing diacultures of text.

In the drawings, like reference numerals designate identical or corresponding parts throughout the several views. Further, as used herein, the words "a," "an" and the like generally carry a meaning of "one or more," unless stated otherwise.

Automated filtering has been relied on for subject or topic indicating words—primarily nouns—because the task was defined as finding documents on a certain subject, not as finding documents written by a certain diaculture. The goal has been generic filtering ability that has been developed to work on all text.

Aspects and exemplary implementations in accordance with this disclosure change such a filtering approach. Some exemplary implementations include:
(1) Normalizing content words by replacing them with N for noun and V for verb to generalize patterns across different subject domains;
(2) Retaining 'stop' words, to pick up patterns, manners, or structures of expression; and
(3) Training filters (e.g., linguistic feature filters (LFFs)) on specific data streams, selected by diaculture, and learning to distinguish these from the general background of all data.

A process can include obtaining blog comments for background noise and targeted diacultures corpora; tokenizing, including substitution of symbols (N, V etc.) for topic related words; and retaining grammatical markers ('ing', 'ed', etc.).

Topics—subject domains—are now largely absent from resulting text. Although the discussed exemplary implementations are related to blogs and comments of blogs, it should be appreciated that other implementations can replace the blogs (and specifically the comments attached to the blogs) with emails, tweets, and a variety of other text-based sources. Further, text can be acquired from a plurality of different sources (emails, tweets, blogs, comments, posts, etc.) and collectively used in the data sets described herein.

Gram scores are learned—1, 2 and 3-grams are constructed for each token, using left context. Each gram is given a score by comparing gram frequencies between background noise and targeted (training) data sets. Many scoring methods are possible. A selected or preferred method provides stable thresholds across training sets and provides the best discrimination (F-score).

New blog comments are then scored, using the learned gram scores. Each token is given a score value based on the maximum of the scores of the grams within which it occurs. A five token window (an exemplary size) is run across the text, left to right, and given a score for each position of the window, which is the average of the token scores. Contiguous windows with scores over a threshold are combined into phrases; these phrases represent "hits" or pieces of text that are highly indicative.

A complete blog comment (all of the comments of a blog post) is scored by summing the scores of the phrases and dividing by the number of tokens in the piece of text. Placeholders can be used for words indicating what a blog comment was discussing.

Verbs, nouns, adjectives, adverbs, URLs and numbers are changed to placeholders. "Be," "have" and "do" verbs and other "content-free" words are retained. Is turns to is, therefore turns to therefore, anyway turns to anyway. Weird non-alphanumeric (for example, %&&2a5*) and most punctuation are stopped. "End-of-sentence" markers (, !?.) are turned to (kept) <•>. Left context is examined to disambiguate nouns and verbs (the bags, he bags).

If a language other than English is utilized with aspects of this disclosure, references to "left" herein can be replaced to "right" (when the language reads right to left instead of left to right).

Sliding "windows" of tokens are created, and each is scored based on an average of token scores. Phrases are determined based on contiguous windows having scores over a certain threshold. The score of a blog is the sum of its phrase scores divided by the number of tokens in the blog. An exemplary goal is a 70% F-score on the categorization task—distinguishing target text from background noise, where $$F = \frac{2PR}{P+R}.$$

Precision (P)=% blogs of Interest out of the blogs retrieved.
Recall (R)=% blogs of Interest out of all the blogs of interest.

A set construction was composed of 327 arbitrarily selected sets of comments from the noise corpus, plus a special blog from the training corpus. One ½ was used for training the other ½ was not used for training. The set was manually reviewed to determine the complete Recall. Five blogs of interest were determined out of 328 test blogs. An F-Score (80%) resulted from the 5 highest scoring sets of comments, which included four out of the five blogs of interest.

LFFs learn distinctive syntactic features of diacultures, not topics or semantics; incorporate slang, fragments, special terms, and leverages available volumes of text for training.

Aspects of this disclosure and sociolinguistics of diacultures (referred to hereinafter as diacultures for short) can identify or find blogs or other text-based (alphanumeric-based) content whose participants have a particular cultural background. An area of interest here is in the cultures of groups other than those defined by nation, language, or ethnicity (e.g., not at the level of 'Iranian') and also narrower than what is often meant by 'subcultures' (e.g., Iranian pop-music scene). The term "diacultures" is used to indicate an interest in specific, often small scale groups, such as 'radical feminists' or 'north American militias.' However, definitions of subculture and diaculture overlap, and investigations have covered both larger less-well-defined groups, and smaller more-organized groups of people.

Sociolinguists have conventionally known that language features—vocabulary use, phonetic features (like accents), and syntactic characteristics—develop within frequently interacting groups that distinguish the group's language from others speaking the same broader language. Of these three categories of features, research can concentrate on syntactic features, and those aspects of vocabulary use which are general, as opposed to topic or domain specific. According to exemplary implementations discussed herein, a particular topic in a blog discussion, e.g., can be ignored, through means described later, and linguistic indicators that help determine whether a blog is the kind that is being search for can be isolated and/or identified.

According to an exemplary implementation, a method for finding blogs, referred to as a "blog of interest," whose participants have a particular cultural background is provided. In such a method, a system is trained and then used to find blogs of interest. Blogs are then parsed into n-grams of tokens. The training process can amount to calculating scores for n-grams, which allows for the scoring of blogs to find those of interest. Exemplary methods of scoring blogs are discussed herein, and an exemplary experiment is also discussed herein.

A blog can consist of or include a set of postings (or posts) made by the owner of the blog, and a set of comments made by other individuals about each posting. Since the nature of the participants in a blog discussion is of interest, the actual topic of a posting, or the posting itself, can be ignored, leading to an analysis of just or only the comments. A blog owner or author of a posting may or may not be a member of a diaculture, even though the subject matter in the posting draws the attention of people in a particular diaculture. In addition, a size of each posting tends to be much larger than a total size of comments about the posting. For these reasons, the text from posts would dominate the "conversation," making it harder to find enclaves of commenters from the diaculture of interest. As used herein, the term "blog" refers to a set of comments found with respect to a post, where all text found in the post can be exclude in one implementation. Metadata about comments, such as the name of the commenter and the date of the comment, can also be excluded. This excluded text can be utilized by other analysis methods in conjunction with other searching or identification methods.

FIG. 1 illustrates an exemplary algorithm 100 by way of a flowchart, which can be executed in whole or part by one or more processors, processing systems, circuits or other hardware components. The steps illustrated in algorithm 100 can be carried out as single processes or can refer to multi-step processes. Further descriptions of these steps are provided in later portions of this disclosure.

At S100, text is extracted. The text can be a comment on a blog, or any other written document. The text is tokenized at S104, and token grams are constructed at S106. These grams are scored at S108 based on a relationship between a training data set and a baseline data set of other text/comments/written documents. Windowing is performed at S110 to form a plurality of windows of tokenized grams. The windows are scored at S112, and a result is analyzed to effect a comparison of how well the text matches the training data set in view of the baseline data set by way of the scores at S114. Results are then displayed at S116.

Tokenizing Text

The algorithm includes extracting text from the comments of a blog by lexical analysis, and tokenizing the extracted text, which results in a series of tokens. The tokens are either individual words from the text (verbatim) or symbols representing certain syntactic classes of individual words (e.g., topic words). For example, the word "car" in a comment can be tokenized with the symbol <N> since it is a noun. Certain words though, such as "the," are not changed into symbols, but left unaltered. So, the word "the" becomes the token "the." In other words, the tokenizing is selective, in that some words are changed, while others are not (e.g., non-topic words).

After the tokenizing, 1, 2 and 3-grams of tokens are constructed. For example, "the" is a one-gram, "the <N>" is a two-gram and "the <N> in" is a three-gram of tokens. These grams may be referred to herein as n-grams or just grams for short. Further, although exemplary implementations refer to 1-3 grams, further grams can also be implement.

Scoring n-Grams

To score n-grams, a number of times the grams appear in distinct corpora of blogs (just the comments) are counted. For purposes of discussion, consider two distinct corpora of blogs—a first blog and a second blog. The first blog is a baseline corpus and the second blog is a training corpus, sometimes called an exemplar when the training corpus contains only one blog. After the counting, the resulting two counts generated for each n-gram are combined in accordance with formulas discussed below.

Scoring Blogs

Using the n-gram scores, a blog is scored by tokenizing it and then "windowing" the tokenized comments to find phrases within comments that indicate that the speaker is from a diaculture of interest. Windowing is a process of "reading" or analyzing a fixed number of words (several words) at a time in a very precise way. The scores of several consecutive windows are combined into "phrases," which may or may not be whole sentences. Further details on the windowing procedure and the scoring of tokenized phrases (which may be whole sentences) are discussed below.

Tokenizing Blogs

People in close communication with each other who consider themselves members of a group develop distinctive ways of speaking and writing that reflect their membership in that group. Some of these distinct patterns of communication relate to developments within the group, that is, specialized terms and expressions are created and carried forward as signs of the group's exclusive membership or collectively adopted phraseology. People not in the group cannot understand everything that is being said or do not know the "trainings" of being in the group. Class-based accents, professional jargon, and gang slang are all examples of this kind of "in-group out-group" training. Additionally, within larger groups of speakers of a language, regional usages develop, which can be distinctive in speech and in writing.

People who do not speak a language as a first language often have grammatical and vocabulary usages that are distinctive to their original language group and the method through which they learned their second language. Many of the distinctive features of these sub-languages of various kinds are not related to the topics that people discuss but to the non-topical words, phrases and syntactical constructions that they use. The use of idioms, spelling, the dropping of articles, use of improper tenses, mismatch of plural/singular between verbs and nouns, etc., in English are all possible indicators of particular group membership.

None of these potential indicators is dependent on a topic of discussion. A generalize procedure thus includes filtering out the topic of conversational text, and using what remains to determine whether the writer is a member of a particular diaculture.

Topic-Free Words

It is difficult to accurately and definitively identify words that can be considered "topic-free." For example, the word "the" can be found in the text of many topics, but the word "car" may not. To simplify determinations of topic-free words, the exemplary implementations discussed herein define numbers, nouns, verbs, adjectives and adverbs ending in "ly" as topic words with the exception of be verbs (am, are, etc.), "have" verbs and "do" verbs. The remainder words are defined as topic-free.

To tokenize words, topic words are converted into symbols and topic-free words are passed along unchanged. It should be appreciated here that, in general (but not necessarily exclusively), none of the words are not passed along. That is, in exemplary implementations, every word encountered is either passed unchanged or replaced with a symbol. For example, words like "the," "and," and "is" are usually ignored (stopped) when analyzing text for its topical content. In some aspects, the only text that may be disregarded (stopped) are non-alphanumerics, except those found in complex URLs.

Table 1 provides an example of how words of different grammatical classifications are tokenized.

TABLE 1

| Grammatical Classification | Tokenization |
| --- | --- |
| Verbs | <V>, <Ved>, <Ven>, <Ving>, <Vs> |
| Nouns | <N>, <Ns>, <N's> |
| Adverbs | <Adv> |
| Adjectives | <Adj>, <Adjer>, <Adjest> |
| URLs | <N> |
| Numbers (literals such as 123, 1.7, seven, etc.) | <#> |
| Possessive pronouns | no change |
| Dates | no change |
| Auxiliaries | no change |
| Pronouns | no change |
| Articles | no change |
| Prepositions | no change |
| Misspellings, names and unknown words | no change |
| Single independent clause terminators (? ! ;) | <.> |
| Non-alphanumeric | stopped |

Examples of tokenized topic words are represented in Table 2.

TABLE 2

| Token | Example |
| --- | --- |
| <V> | break |
| <Vs> | breaks |
| <Ved> | broke |

TABLE 2-continued

| Token | Example |
| --- | --- |
| <Ven> | broken |
| <Ving> | breaking |
| <N> | person |
| <Ns> | people |
| <N's> | people's |
| <Adv> | nicely |
| <Adj> | nice |
| <Adjer> | nicer |
| <Adjest> | nicest |
| <#> | 1,245.25 |

The past participle of most verbs ends with "ed," just as does the past tense. When these words are tokenized, they are mapped to <Ved>, even if they are used as a past participle in the phrase or sentence they come from. In the discussed exemplary implementations, there is no token for possessive plural nouns. Both of these simplifications simplify a parsing method used to determine the parts of speech for these word types. Take, for example the quote—'it is not very nice to take dogs' bones away'. Without deeper parsing, it is not possible to determine whether—dogs'—is a possessive plural or the end of a quote.

Also, third person nouns, verbs and plural nouns are often polysemic. For example, there may be a question as to whether "bag" is a noun or a verb. Grocery checkout clerks often bag groceries in a bag, so it's not always clear which is which. However, it is sometimes possible to determine such words by looking at the word that comes directly before it (its immediate left context). For example, the adverb "often" marks only verbs and the article "a" only marks nouns. By collecting verb markers in one set and noun markers in another, it becomes more likely to determine the part of speech, noun or verb, meant by checking the immediate left context against these sets. Although this is not a complete or 100% accurate solution, it produces good results.

Grams can be defined as a sequence of symbols, and specifically, stop words and tokens. A 1-gram is a sequence with a single symbol, a 2-gram (or 2-grams) has two symbols, and a 3-gram (or 3-grams) has three symbols. As a class, these can be called "n-grams" or just "grams" for convenience. For example, "I<Ved> a <N> for <N>" is a 6-gram. This can be decomposed into four (contiguous) 3-grams, "I<Ved> a", "<Ved> a <N>", "a <N> for", and "<N> for <N>." These four 3-grams can be defined as separate windows of the 6-gram, where the 6-gram is viewed through a window that can see only three symbols at a time. Breaking down (or "windowing") n-grams in this manner facilitates the inspection of individual sentences. It also provides a more uniform way of analyzing sentences (of length three or more) of a wide range of lengths.

Learning n-Gram Scores

Scores for n-grams are computed so that they can be subsequently used to score blogs, or more precisely, the comments of blogs. To do this, a baseline distribution of n-grams is computed, against which a distribution of the n-grams in a training set of blogs can be compared. Exemplary comparisons are discussed below.

A baseline distribution (a baseline data set) includes a large number of blogs, which form a baseline corpus. The blogs are each subjected to a procedure that is similar to that in FIG. 1, but the procedure varies because instead of assigning score, scores are generated (which are then assigned to a blog that is later analyzed). This can be referred to a training sequence.

In "training" the baseline corpus, e.g., the sentence "Rose is a rose is a rose," can be tokenized as "<N> is a <N> is a <N>." The 3-gram "is a <N>" appears twice, so its count is 2. The count of the 1-gram "<N>" is 3. To obtain a training distribution, the same procedure is followed, except a training corpus of blogs is utilized. Note that these are not probability distributions, but are simply counts.

The scores created for grams are used to score documents. The capabilities of how well the blog scoring methods described herein work are measured using a measure known as an F-score. The F-score is defined to be $$F = \frac{2PR}{P+R},$$

where F is the precision of a scoring method and R its recall. Suppose a threshold is set so that only blogs with scores above the threshold are considered (or "found"). The precision relative to this threshold is the number of blogs of interest found divided by the total number of blogs found. The recall is the number of blogs of interest found divided by the total number of blogs of interest in the blog corpus that is being scored.

Given these definitions, a scoring method can be said to perform well or poorly depending on whether its use ultimately yields high or low F-score. A target (threshold) F-score is 0.70.

N-Gram Variations

A Linguistic Feature Filter (LFF) and a Modified Linguistic Feature Filter (MLFF) are two variations of the algorithms used to determine the virtual accent for each of the documents. The two algorithms will be described in more detail in the following sections.

LFF

For LFF, the scores for 1, 2, and 3 gram sentences as well as 3 gram windows were taken. Where a sentence was defined as a series of tokens followed by an end-of-sentence marker, and a window would be a series of 3 tokens followed by another token and no series of n-gram was a subset of another. The various token gram lengths were added to support tweets and other blocks of text that tend to be terse with short sentences that otherwise would not hit on larger gram sizes.

Table 3 shows an example of the LFF algorithm snippet tokenization.

TABLE 3

| Token | Action | Resulting Queue |
|---|---|---|
| Hi | Push onto gram queue | Hi |
| <Ns> | Push onto gram queue | Hi <Ns> |
| <EOS> | Increment sentence count for 2 "Hi <Ns>". Empty Queue | <EMPTY> |
| My | Push onto gram queue | My |
| <N> | Push onto gram queue | My <N> |
| <V> | Push onto gram queue | My <N> <V> |
| Farhan | Increment phrase count for "My <N> <V>". Remove first queue item. Push onto gram queue. | <N> <V> Farhan |
| <EOS> | Increment sentence count for "<N> <V> Farhan". Clear queue. | <EMPTY> |
| I | Push onto gram queue | I |
| <V> | Push onto gram queue | I <V> |
| a | Push onto gram queue | I <V> a |
| <Adj> | Increment phrase count for "I <V> a". Remove first item. Push onto queue. | <V> a <Adj> |
| <N> | Increment phrase count for "<V> a <Adj>". Remove first item. Push onto queue. | a <Adj> <N> |
| for | Increment phrase count for "a <Adj> <N>". Remove first item. Push onto queue. | <Adj> <N> for |

MLFF

A slightly modified version of LFF was also created. This version uses a series of overlapping n-grams. There is no distinction between a mid-sentence n-gram and an n-gram that is followed by a sentence break. Again, the gram queue is cleared at a sentence break. The n-gram count is incremented after each push for each queue that is full. Also, for 1-grams, tokens are not counted.

Table 4 shows an example of the MLFF algorithm snippet tokenization.

TABLE 4

| Token | Action | 1-Gram | 2-Gram | 3-Gram |
|---|---|---|---|---|
| "Hi" | Push/Increment | Hi | Hi* | Hi* |
| <Ns> | Push/Increment | <Ns>* | Hi <Ns> | Hi <Ns>* |
| <EOS> | Clear | | | |
| My | Push/Increment | My | My* | My* |
| <N> | Push/Increment | <N>* | My <N> | My <N>* |
| <V> | Push/Increment | <V>* | <N> <V> | My <N> <V> |
| Farhan | Push/Increment | Farhan | <V> Farhan | <N> <V> Farhan |
| <EOS> | Clear | | | |
| I | Push/Increment | I | I* | I* |
| <V> | Push/Increment | <V>* | I <V> | I <V>* |
| a | Push/Increment | a | <V> a | I <V> a |
| <Adj> | Push/Increment | <Adj>* | a <Adj> | <V> a <Adj> |
| <N> | Push/Increment | <N> | <Adj> <N> | a <Adj> <N> |
| for | Push/Increment | For | <N> for | <Adj> <N> for |
| you | Push/Increment | You | for you | <N> for you |
| <EOS> | Clear | | | |

Notation

Taken as a collection, the n-grams derived from a blog corpus are an ordered multiset. That is, the n-grams are a collection in which the same n-gram can occur more than once. This can be referred to as an n-gram collection. A set of distinct grams in an n-gram collection can be referred to as the underlying set of the collection. The underlying set of a collection is formed by choosing exactly one representative n-gram from the n-gram collection. As used herein for simplicity, an n-gram collection is referred to as a collection and an n-gram is referred to as a gram for short.

Definitions are set forth in Table 5.

TABLE 5

| $\mathcal{B}$ or B | The baseline collection |
|---|---|
| $\mathcal{T}$ or T | The training collection |
| $\overline{X}$ | The underlying set of the collection X |
| $X_n$ | The underlying set of n-grams in the collection X |
| $\tau$ or $g$ | A gram in a collection |
| $\|\tau\|_X$ | The number of times the gram $\tau$ appears in the collection X (the size of $\tau$) |
| $Pr(\tau)_X$ | The probability of choosing the gram $\tau$ from the collection X |
| $\rho(\tau)_X$ | The rank of $\tau$ in collection X in order of size |
| $\sigma_i(\tau)$ | The score of the gram $\tau$ using Method i |

It is assumed that $\mathcal{T} \subset \mathcal{B}$ to ensure that there are no denominators that are zero in the following calculations. It is also assumed that $|\mathcal{T}| \ll |\mathcal{B}|$ since the training corpus should be much smaller than the baseline corpus. In the following sections, several gram scoring methods are described.

Probability Based Scoring

Method 1: Log Probability Ratio

In Method 1, the score is calculated for each gram $\mathcal{T}$ by taking the log of the ratio $Pr(\tau)_\mathcal{T}$ to $Pr(\tau)_\mathcal{B}$. That is, the following relationship is satisfied:

$$\sigma_1(\tau) = \log\left(\frac{Pr(\tau)_\tau}{Pr(\tau)_B}\right)$$

$$= \log\left(\frac{\frac{|\tau|_\tau}{|\tau|}}{\frac{|\tau|_B}{B}}\right)$$

$$= \log\left(\frac{|\tau|_\tau}{|\tau|_B}\frac{|B|}{|\tau|}\right)$$

$$= \log\left(\frac{|\tau|_\tau}{|\tau|_B}\right) - \log\left(\frac{|\tau|}{|B|}\right).$$

The rationale is that if the probabilities relative to each corpus are the same, then the score is 0. All other scores are positive (appears more often than expected) or negative (appears less often than expected). Notice that the denominator of any fraction is never 0, since $\mathcal{T} \subset \mathcal{B}$.

Besides not performing well, this method suffers from producing scores with very high variance from training set to training set. This requires one to guess what threshold to set from training set to training set to get acceptable results. To remedy this, $\sigma_1(\tau)$ is normalized to keep this variation to a minimum.

Method 2: Normalizing with a Score Average

In Method 2, the score of each gram $\mathcal{T}$ is calculated using normalization to remove some of the problems of Method 1. The following relationships are established:

$$\sigma_2(\tau) = \sigma_1(\tau) - \frac{1}{|\bar{\tau}|}\sum_{\tau' \in \bar{\tau}} \sigma_1(\tau')$$

$$= \left(\log\left(\frac{|\tau|_\tau}{|\tau|_B}\right) - \log\left(\frac{|\tau|}{|B|}\right)\right) -$$

$$\frac{1}{|\bar{\tau}|}\sum_{\tau' \in |\bar{\tau}|}\left(\log\left(\frac{|\tau'|_\tau}{|\tau'|_B}\right) - \log\left(\frac{|\tau|}{|B|}\right)\right)$$

$$= \log\left(\frac{|\tau|_\tau}{|\tau|_B}\right) - \frac{1}{|\bar{\tau}|}\sum_{\tau' \in |\bar{\tau}|}\log\left(\frac{|\tau'|_\tau}{|\tau'|_B}\right).$$

As is the case with Method 1, grams that occur relatively more frequently tend to get higher scores. Method 2 has the advantage of factoring out $$-\log\left(\frac{|\tau|}{|B|}\right)$$

which can be excessively large (recall that $|\mathcal{T}| \ll |\mathcal{B}|$), and swamps the effect of $$\log\left(\frac{|\tau|_\tau}{|\tau|_B}\right)$$

in the definition of $\sigma_2(\tau')$. In addition, Method 2 compares each $$\log\left(\frac{|\tau|_\tau}{|\tau|_B}\right)$$

with an actual statistical expectation, which tends to smooth out deleterious effects of dealing with grams that occur rarely in $\mathcal{S}$. Finally, Method 2 stabilizes the choice of threshold when using different training sets, although some fine tuning is still required.

Method 2 works well but still suffers from producing scores whose statistical variance is relatively high, making setting thresholds difficult from training set to training set.

Method 3: Normalizing with a Score Average and Standard Deviation

Here, $$\sigma_3(\tau) = \frac{\sigma_1(\tau) - \frac{1}{|\bar{\tau}|}\sum_{\tau' \in \bar{\tau}} \sigma_1(\tau')}{\delta_3},$$

where $$\delta_3 = \sqrt{\frac{1}{|\bar{\tau}|}\sum_{\tau' \in \bar{\tau}}\sigma_1(\tau')^2 - \left(\frac{1}{|\bar{\tau}|}\sum_{\tau' \in \bar{\tau}}\sigma_1(\tau')\right)^2}.$$

This makes scoring much more robust than methods 1 and 2, yielding scores that allow for the setting of thresholds that are more reliable from training set to training set.

In an experimental comparison between methods 1, 2 and 3, method 3 was the most stable method with respect to selecting a good threshold and provided the best in scoring performance.

Method 4: Conditional Probability Method

There are many ways to deal with n-grams. In the first three methods, the probabilities that were computed for each gram were assumed to be independent. This works surprisingly well, but since the independence assumption isn't true, conditional probabilities can be derived for each gram, and then the computed scores of each gram can be combined in various ways.

Assume that gram collection X is large enough so that $$\frac{|\chi|}{|\chi|-2} \approx 1.$$

The following approximations can then be made. Let $\alpha$, $\beta\alpha$ and $\gamma\beta\alpha$ be 1, 2, and 3-grams respectively. Then, for 2-grams, $$Pr(\alpha | \beta) = \frac{Pr(\alpha\beta)_\chi}{Pr(\beta)_\chi} = \frac{|\alpha\beta|_\chi}{|\chi|-1}\frac{|\chi|}{|\beta|_\chi} \approx \frac{|\alpha\beta|_\chi}{|\beta|_\chi}.$$

Likewise, for 3-grams, $$Pr(\alpha | \gamma\beta) = \frac{Pr(\gamma\beta\alpha)_\chi}{Pr(\gamma\beta)_\chi} = \frac{|\gamma\beta\alpha|_\chi}{|\chi|-2}\frac{|\chi|-1}{|\gamma\beta|_\chi} \approx \frac{|\gamma\beta\alpha|_\chi}{|\gamma\beta|_\chi}.$$

This allows for the following relationships, for 1, 2 and 3-grams, to be defined:

$$\sigma_4(\alpha) = \sigma_2(\alpha),$$

$$\sigma_4(\alpha | \beta) = \log\left(\frac{|\beta|_B}{|\beta|_T}\frac{|\beta\alpha|_T}{|\beta\alpha|_B}\right) - \frac{1}{|T_2|}\sum_{\alpha_2\alpha_1 \in |T_2|}\log\left(\frac{|\alpha_2|_B}{|\alpha_2|_T}\frac{|\alpha_2\alpha_1|_T}{|\alpha_2\alpha_1|_B}\right),$$

and

-continued $$\sigma_4(\alpha \mid \gamma\beta) = \log\left(\frac{|\gamma\beta|_N}{|\gamma\beta|_S} \frac{|\gamma\beta\alpha|_S}{|\gamma\beta\alpha|_N}\right) - \frac{1}{|S_3|} \sum_{\alpha_3\alpha_2\alpha_1 \in |S_3|} \log\left(\frac{|\alpha_3\alpha_2|_N}{|\alpha_3\alpha_2|_S} \frac{|\alpha_3\alpha_2\alpha_1|_S}{|\alpha_3\alpha_2\alpha_1|_N}\right).$$

This method can be modified to incorporate normalization and the standard deviation procedures used in Method 3.

Method 5: Normalized Max Scoring

This can be a simple and effective scoring method. First, a log of the ratio of the counts of grams from each corpus, σ($g$). Here, $g$ indicates a gram.

$$\sigma(g) = \log\left(\frac{g\mid_T}{g\mid_B}\right)$$

The gram for which this value is maximum is found, it is divided into σ($g$), subtracting the result from 0.5. This normalizes the score of each gram to a value between −0.5 and 0.5.

$$\sigma_5(g) = 0.5 - \frac{\sigma(g)}{\max_{g^t}\{\sigma(g^t)\}}$$

In addition to this method being very simple, it turned out to perform better than Methods 1-3.

Method 6: Rank Based Scoring

With rank based scoring, probabilities are disregarded. Recall from the definitions table that the size of a gram τ in a collection X is the number of times τ appears in X If the grams in X are ordered by descending size, then the place of a gram in the ordering is its rank in X. For example, If X={a, a, b}, then the rank of a is 1 and the rank of b is 2. It's possible that two grams have the same size in a collection as in X={a, a, b, c}. To resolve the rank of b and c, b and c are assigned the same rank of 2 in this case. It is assumed that, |τ|x=|τ'|x implies ρ(τ)x=ρ(τ')x. That is, same rank is applied to all grams of the same size in a collection.

A multiset $B_{\mathcal{T}}$ is constructed, where for each gram $\tau \in \mathcal{T}$, all the copies of $\mathcal{T}$ in $B$ are put into $B_{\mathcal{T}}$. That is, $B=\{B_{\mathcal{T}\in} \mathcal{T}$ and $\mathcal{T} \in \overline{\mathcal{T}}\}$. The normal meaning of the word "rank" is violated by assuming that $|\tau|_x=|\tau'|_x$ implies $\rho(\tau)_x = \rho(\tau')_x$. That is, grams with the same size (see the definitions section) are assigned in χ with the same rank. Otherwise, two such grams would have to be given a different rank, making the notion of rank meaningless for the purposes described herein. With these definitions and conditions, the following relationship is defined:

$$\sigma_6 = \frac{(\rho(\tau)\mathcal{T} - \rho(\tau)B_{\mathcal{T}})}{|\mathcal{T}|} - \frac{1}{|\mathcal{T}|}\sum_{\tau' \in \mathcal{T}} \frac{(\rho(\tau')\mathcal{T} - \rho(\tau')B_{\mathcal{T}})}{|\mathcal{T}|}.$$

A significant complexity involved in computing these scores is sorting the ranks of the grams in $B$ for each training set. An advantage of Method 6 is that it is completely independent of the sizes (as multisets) of $\mathcal{T}$ and $B$. Also, thresholding can be very simple and uniform from corpus to corpus. In addition, as in Method 3, normalization is possible with a standard deviation.

Method 7: Straight Ratio

In Method 1, the score of each gram is calculated by dividing the number of occurrences of the n-gram in the training set by the number of occurrences of the n-gram in the baseline set. Here, $g$ indicates a gram.

$$\sigma(g) = \frac{|g|_T}{|g|_B}$$

The scores can be normalized using the standard deviation.

In testing, this approach tended to produce poor results for most tested diacultures. In some cases, the results were significantly worse than the original Log(S/N).

Method 8: Ratio of Logs

Another approach goes back to using the logarithm. However, in this case, the log of the training count and baseline count is taken before dividing instead of after.

$$\sigma(g) = \frac{\log(|g|_T)}{\log(|g|_B)}$$

Testing showed that this approach had several diacultures perform better using a default threshold of zero.

Method 9: Alternate Normalized Max Scoring

This is a slight variation of the max-score based algorithm. In this case, the training count is divided by the training count plus the noise count. In this case, it is not necessary to add logic to handle the situation where an n-gram exists in training, but not in the baseline noise.

$$\sigma(g) = -\log\left(\frac{|g|_T}{|g|_B + |g|_T}\right)$$

Again, normalize to be between −0.5 and 0.5:

$$\sigma(g) = 0.5 - \frac{\sigma(g)}{\max_{g}\{\sigma(g')\}}$$

This approach seemed to provide a more consistent score across diacultures. Another advantage during testing was that minor changes to the threshold when scoring documents had less of an impact. This means less fine tuning needed for each data set.

Blog Scoring

Given a set of training gram scores derived from baseline and training corpora, individual blogs can be scored. First, a blog is tokenized in a manner that is the same as that described in conjunction with the algorithms described herein. Then, the tokens in the tokenized blog are scanned, and scores are computed for each token, one at a time.

Scoring Tokens in a Blog

A tokenized blog is "read" (analyzed and/or scanned) in a manner similar to how a reader would read English text—left to right. Instead of reading words, however, tokens are read. Each time a token is read, it is assigned a score, so the blog from which it was derived can be scored. Since scores for grams have been obtained, the scores of the grams that contain the token of interest are combined.

For example, suppose a blog is tokenized, and while scanning it three tokens "<N> is a" are found, which are organized into three grams as below.

a
is a
<N> is a

One strategy to obtain a token score for "a" is to look up the training scores for all three of the grams above and combine them in some manner. A score from combining all of them can be referred to as a composite score of "a." Further, "is" and "<N> is" are referred to as the left context of "a." It may be that a token is the first or second token in a sentence of tokens. That is, a token might not have a left context or it might only have one token for a left context. These are limiting cases discussed later.

The exact value of the composite score of a token depends on the function used to combine their scores. Three composite scoring functions were examined. Let γβα be three tokens in a sentence of a tokenized blog and let σ(α), σ(βα), and σ(γβα) be the learning scores of the grams α, βα, and γγα, respectively. The following composite scoring functions are defined:

$$c_1(\alpha,\beta\alpha,\gamma\beta\alpha)=\max(\sigma(\alpha),\sigma(\beta\alpha),\sigma(\gamma\beta\alpha))$$

$$c_2(\alpha,\beta\alpha,\gamma\beta\alpha)=(\sigma(\alpha)+\sigma(\beta\alpha)+\sigma(\gamma\beta\alpha))/3$$

$$c_3(\alpha,\beta\alpha,\gamma\beta\alpha)=\sigma(\alpha),\sigma(\beta\alpha)/2+\sigma(\gamma\beta\alpha))/3$$

The intuition behind $c_1$ is that the gram with the highest score is also the one that takes into account the most significant left context. $c_2$ was examined to take a traditional average. The intuition behind $c_3$ is that, since 3-grams are rarer than 2-grams, which are in turn rarer than 1-grams, the scores of 3-grams tend to be higher than that of 2-grams, and the scores of 2-grams tend to be higher than that of 1-gram. The intent is to "even out" the contribution of each score so that all three are given more balanced weight. By far and away, $c_1$ gives the best results, $c_2$ gives the worst, and $c_3$ gives results that are somewhere in between, but are not particularly good.

Windowing

Windowing, as conventionally utilized, resulting in a "smoothing" of curves. To window a tokenized blog, a fixed number of contiguous tokens are considered at a time. If a window is moved to the right by disregarding the leftmost token and incorporating the next one to the right, then this can be considered as moving the window to the right. As the window is moved to the right, a series of scores for each window can be computed. This is illustrated below with the sentence:

The Americans have a right to be proud of their hard work and sacrifice.

After tokenizing, this becomes:

the <Ns> have a <N> to be <Adj> of their <Adj> <N> and <N>

Using the scores for each token calculated offline, a window is run across the sentence to get the following windows of five tokens each.

the <Ns> have a <N>
<N> have a <N> to
have a <N> to be
a <N> to be <Adj>
<N> to be <Adj> of
to be <Adj> of their
be <Adj> of their <Adj>
<Adj> of their <Adj> <N>
of their <Adj> <N> and
their <Adj> <N> and <N>
<Adj> <N> and <N> <.>

While the windows are built, a composite score of each token is obtained, and their average is obtained. For this particular set of windows, the window scores below are obtained.

(−0.47) the <Ns> have a <N>
(−0.48) <N> have a <N> to
(−0.48) have a <N> to be
(0.69) a <N> to be <Adj>
(1.67) <N> to be <Adj> of
(2.07) to be <Adj> of their
(2.40) be <Adj> of their <Adj>
(3.14) <Adj> of their <Adj> <N>
(1.63) of their <Adj> <N> and
(0.79) their <Adj> <N> and <N>
(−1.88) <Adj> <N> and <N> <.>

Note that the scores for these windows start low (negative in fact), rise to a peak of 3.14, and then dip back below zero.

Entry and exit thresholds are set to collect windows like those above into a larger one. For example, if phrase entry and exit thresholds are set to 1.0, then the following windows are collected, while the others are ignored.

(1.67) right to be proud of
(2.07) to be proud of their
(2.40) be proud of their hard
(3.14) proud of their hard <N>
(1.63) of their hard <N> and This actually provides a part of the sentence above (a phrase) when the tokens are put back in order.

right to be proud of their hard <N> and

The score of the phrase is the maximum score of these windows. In this case, the largest score is 3.14 so the score of this phrase is 3.14.

In experiments, varying entry and exit thresholds were utilized to form phrases. For example, if an entry threshold of 1.0 and an exit threshold of 0.5 were chosen, then the following phrase can be obtained:

right to be proud of their hard <N> and self-sacrifice
because the window
(0.79) their hard <N> and self-sacrifice has a score above 0.5. The larger phrase still has a score of 3.14, however.

Formally, the following definitions can be made. If $W=\tau_1 \tau_2 \ldots \tau_n$ is a window, then its score is:

$$\sigma(W) = \frac{1}{n}\sum_{i=1}^{n} c(\mathcal{T}_i).$$

If $P=\tau_1 \tau_2 \ldots \tau_n$ is a phrase, then its score is:

$$\sigma(P) = \max_{\mathcal{T}_i \in P}\{c(\mathcal{T}_i)\}.$$

The reason for this is that the peak score is of interest, because a high peak score represents a solid "hit."

An alternative way of computing a phrase score is to divide the average value of its window scores by its peak score. Here, $$\sigma(P) = \frac{\frac{1}{|\mathcal{T}_i \in P|}\sum_{\mathcal{T}_i \in P} c(\mathcal{T}_i)}{\max_{\mathcal{T}_i \in P}\{c(\mathcal{T}_i)\}}.$$

A high value indicates a relatively high and uniform window score within the phrase. Uniformity indicates continuity across the scores of tokens in the phrase. A single high score in a phrase with relatively low scoring tokens would tend to be averaged out. This would remove phrases whose score is made artificially high using the previous method. This should also be more or less self-normalizing.

In another example, a window of three n-grams is used at a time. This is done by "moving" the window to the right by popping off the leftmost token and adding the next token to the right. As the window moves to the right a series of scores is computed for each window. This is illustrated with the sentence: "George has a right to be proud." After tokenizing, this becomes: <N> has a <N> to be <Adj>.

After windowing, five 3-grams "<N> has a", "has a <N>", "a <N> to", "<N> to be", "to be <Adj>". Suppose the score of each window is −0.1, 0.2, 0.5, 0.2, −0.2, respectively. Setting a threshold of 0.2, the three middle windows are combined into the phrase "has a <N> to be." The average of these three windows is 0.3, which is the score of the phrase. This phrase is called a hit, denoting its score by $\sigma_{hit}(hit)$.

Blog Scoring

In a first method, a threshold for phrase scores is set, and a number of those above the threshold (called "hits") are counted. Using a proper setting of the threshold and a threshold to limit the number of hits, it is possible to find the targeted kinds of blogs (e.g., Iranian blogs). The difficulty is that it is not self-normalizing, since it does not take into account the size (in tokens) of the blogs.

In a second method, better results were achieved. Sum scores of hits are divided by the size of the blog in tokens. Specifically, $$\sigma(B) = \frac{1}{|B|} \sum_{hit_i \in B} \sigma(hit_i).$$

This is relatively self-normalizing in that the blog score reflects the density of hits in the blog as well as the scores of the hits. One limitation of this is that blogs that have only one section that is dense in hits will not score high as a blog. This is relatively self-normalizing in that the blog score reflects the density of hits in the blog as well as the scores of the hits.

In the current implementation, uniform hit density is important. However, it is possible to compute scores for blogs that contain smaller segments of hits as well. This may require the use of another windowing method to find localized clusters of hits in a way parallel to the windowing method used to score phrases (taking windows of hits rather than windows of tokens).

Experimental Results

During experimentation, many combinations of training methods and composite scoring methods, as well a number of thresholds including phrase and hit thresholds were reviewed. Discussed below is an exemplary combination that allowed for surpassing a target metric of an F-score, such as an F-score of 0.70.

However, several of the alternative methods and settings provided results that were very close to that target metric, obtaining an F-score of 0.667. The results described herein are include those for Iranians writing in English and radical feminists, also in English (amongst others). This should be taken into account when interpreting the scores for these diacultures.

In the current application uniform hit density is important. However, it is possible to compute scores for blogs containing smaller segments of hits as well. This may utilize another windowing method to find localized clusters of hits in a way parallel to the windowing method used herein to score phrases, taking windows of hits rather than windows of tokens.

Using scoring Method 9, an average F-score of 0.74 across all diacultures was obtained when using a threshold of 0.03 for LFF. Adjusting the threshold per diaculture can give better results. However, reducing the amount of adjustment that is required to get good results is advantageous, especially since, even within a diaculture the results could vary based on the test set. The modified version of LFF, fared a little bit better using a threshold of 0.1. In this case, the average F-score was 0.76.

Interestingly, each algorithm had outliers. Table 6 shows results for the LFF algorithm and Table 7 shows the results for the MLFF algorithm. LFF fared poorly for Muslim Brotherhood and Narcotics in the test set, while Modified LFF fared poorly for Iranian Nationals and Open Source. Most of this is believed to be due to the small training and test set that was used and variations in the training set. These values could be increased by providing core data in the training set.

TABLE 6

| Diaculture | Threshold | | | | | | | | |
| --- | --- | --- | --- | --- | --- | --- | --- | --- | --- |
| | 0 | 0.03 | 0.05 | 0.08 | 0.1 | 0.15 | 0.2 | 0.25 | 0.3 |
| Feminist Radicals | 0.899 | 0.921 | 0.926 | 0.928 | 0.915 | 0.85 | 0.786 | 0.708 | 0.545 |
| Hacker | 0.924 | 0.953 | 0.946 | 0.938 | 0.933 | 0.905 | 0.909 | 0.921 | 0.837 |
| Iran | 0.555 | 0.672 | 0.65 | 0.607 | 0.637 | 0.578 | 0.427 | 0.394 | 0.246 |
| Muslim Brotherhood | 0.448 | 0.5 | 0.4 | 0.349 | 0.364 | 0.227 | 0.227 | 0.227 | 0.227 |
| Narcotics | 0.229 | 0.348 | 0.308 | 0.312 | 0.31 | 0.204 | 0.204 | 0.204 | 0.204 |
| North Korean | 1 | 1 | 1 | 1 | 1 | 0.991 | 0.992 | 0.992 | 0.897 |
| Open Source | 0.755 | 0.763 | 0.783 | 0.776 | 0.78 | 0.767 | 0.792 | 0.796 | 0.755 |
| Average | 0.687 | 0.737 | 0.716 | 0.701 | 0.706 | 0.646 | 0.620 | 0.606 | 0.530 |

TABLE 7

| Diaculture | Threshold | | | | |
| --- | --- | --- | --- | --- | --- |
| | 0 | 0.1 | 0.2 | 0.3 | 0.4 |
| Feminist Radicals | 0.927 | 0.972 | 0.928 | 0.951 | 0.767 |
| Hacker | 0.901 | 0.910 | 0.974 | 0.980 | 0.980 |
| Iran | 0.493 | 0.494 | 0.444 | 0.346 | 0.034 |
| Muslim Brotherhood | 0.853 | 0.833 | 0.810 | 0.880 | 0.636 |
| Narcotics | 0.921 | 0.921 | 0.889 | 0.889 | 0.929 |
| North Korean | 1 | 1 | 1 | 1 | 1 |
| Open Source | 0.260 | 0.243 | 0.293 | 0.296 | 0.339 |
| Average | 0.765 | 0.761 | 0.763 | 0.763 | 0.669 |

Training

For testing and training purposes, data for five new diacultures was added (in addition to Iranians writing in English and radical feminists): Hacker, Open Source, North Korean, Narcotics Traffickers, and the Muslim Brotherhood. This data came from a variety of sources such as forums, blogs, twitter, and news articles.

For each diaculture, documents were randomly selected to be part of the test data set and part of the training data set. This way, the test results were not biased by trying to find the exact documents that were trained on.

For a noise corpus, 327 randomly selected blogs were reused.

Then each diaculture corpus was run through a training process and generated the score files for each.

Training Interface

A graphical user interface (GUI) was created for training. This allows the user to enter all the required information such as a cheat sheet, training set, noise, noise set, and the "diaculture" being processed. This "diaculture" is only used to properly name the output files. The GUI can include here a variety of input fields for typing or loading a file (such as a spreadsheet or a text file) for entering the above-noted information. A log output can be displayed, which tracks, in real-time, actions of a processing system in processing corresponding algorithms. The GUI can also include a variety of command buttons that actuate the generations of noise counts and scoring of files. A directory can also be selected to save an output file to, which can be located on a storage device, such as a hard drive or other storage medium.

In one training process, 2,154 distinct blogs posted over a two month period were used as a baseline corpus. Over 11 million grams were extracted from these blogs. Recall that a blog is the set of comments in the blog, not including the text from posts. For the training corpus, one blog is split that contained mainly comments from non-native speakers from Iran using a distinctive way of writing. This particular blog contained 7813 distinct grams. The blog was not edited in any way. This blog was also not one of the 2,154 baseline blogs.

Another blog, which was not in the baseline corpus, was also chosen, which was pared down to comments made only by Iranians with thick "accents." Other than that, no other edits were made. This material was also used for training, but was not included in the test corpus.

To develop the test corpus, 327 arbitrarily chosen blogs were chosen from the baseline corpus. Other numbers of blogs can be chosen. The baseline corpus was used as a source for the test corpus so that the test corpus was an "average" set of blogs. One half of the blogs is used for training, while the other half of the blogs in the training corpus was used to test the test corpus to measure how well it scored compared to the other blogs of interest in the test set. An analysis was then performed to determine where there were any Iranians writing in English among this set of 328 blogs.

Of 328 blogs, only 5 were deemed to contain materials from Iranian non-native speakers of English. This was determined by manually culling blogs with names like "disneyandmore (d0t) blogspot (dot) com." Certain blogs, however, were read carefully when their names seemed to indicate that they might have the content we needed for this experiment—lots of Iranian non-native speakers sign their blogs and comments with names such as "beenishsaharkhan (dot) blogspot (dot) com."

This particular blog (beenishsaharkhan (dot) blogspot (dot) corn) was clearly Iranian in content, but it did not score highly enough contribute to our F-score no matter what threshold settings were chosen. The reason this might be the case is that, while it contained content completely dominated by Iranian issues, the comments made were generally well formed grammatically. Thus, while appearing to be a failure of the system, it may well be evidence that content is indeed ignored as intended.

Scores for all the grams found in the training blog were computed, with the following results:
 Average raw score −5.261465560196693
 Standard deviation of the raw scores 3.7367194807844117
 normalized average score −1.4080440309349116
 Score map size 7813
 1466 training grams were not in the baseline corpus The high standard deviation is a little misleading because the distribution of gram score is power-law distributed, not normally distributed. Knowing this, though, allows for the interpretation of the very negative average score as indicating that most n-grams in the training corpus had very negative scores, indicating that they were very commonly used. Thus there were relatively few grams with high scores, which were actually high positive scores in many cases. The first example presented in this document is a good example of high scoring grams. Hits were therefore rare.

The "Score map size" is the number of distinct grams found in the training corpus. The number of distinct grams found in the noise corpus was about 11 million. Of the 7,813 grams found in the training corpus, only 1,466 were not found in the noise corpus. Those consisted mainly of misspellings, parsing errors and a few Anglicized Iranian words. This number is important in that it indicates that most of the grams in the training corpus were found in the baseline corpus, which means the scoring is relatively fair. The grams, ones not found in the baseline corpus, are assigned a score of 0. Other values, such as a normalized average score, could also be utilized.

Blog Scoring

To score documents (blogs) from the test corpus, windows of fixed size 5 can be utilized. Windows of sizes 2, 3, 4, 5, 6, 7, 8, 9 or 10 (or more), can also be utilized. Window size can also be set as a variable that changes based on other parameters.

Entry and exit thresholds were always chosen to be one fifth as large as the phrase hit threshold. Blog scores were calculated using the second method described above. The phrase hit threshold was set to values ranging from 0.25 to 0.8, but the best results were obtained using a value of 0.5. This threshold value yielded good results for the radical feminist blogs as well. In addition, it was robust over many of the different composite token, window, phrase and blog scoring methods as well. This forms a basis for the claim that Method 3 for scoring grams yields well normalized scores.

Recall that an F-score is derived from the precision and recall of a set of blogs. For example, if the top 10 highest scoring blogs are taken, then a precision and recall for that set can be computed, which allows for the derivation of an F-score of that set. To obtain an F-score of 0.80, 5 blogs were selected with the highest scores. 4 of the 5 were of interest so the precision was 0.8. There were 5 blogs of interest, but only 4 were in the top 5. So the recall was 0.80 as well. Therefore the F-score for this set is:

$$F = \frac{2 \cdot 0.8 \cdot 0.8}{0.8 + 0.8} = \frac{1.28}{1.6} = 0.8,$$

which surpasses the set metric of 0.7. This is an impressive result given that 4 of the 5 blogs of interest were found in the top 5 blogs out of 328 blogs.

Architecture

An exemplary implementation of a system to execute the algorithms described herein is designed to be modular. This allows a user to run variety of diacultures (Iranian, Hackers, . . . ) and methods (LFF, MLFF, Keyword) with just changing configuration files, that can be pre-defined or pre-trained, as appropriate, and stored electronically for future or remote use. Additional methods can be added by implementing an interface to an existing module, which can be implemented by a GUI and an application being executed on a computer system.

Figure 2:
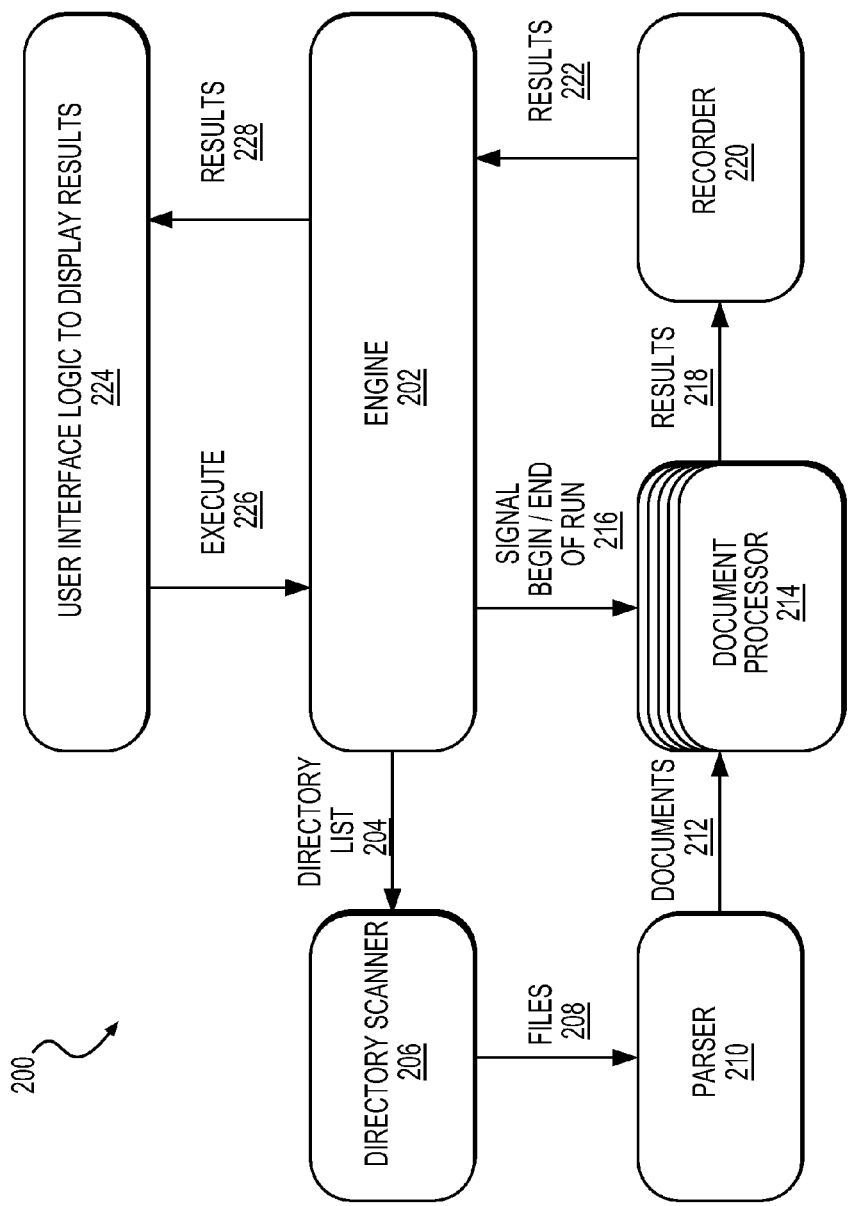
FIG. 2 schematically illustrates an exemplary hardware architecture for a system to analyze diacultures of text.

FIG. 2 illustrates computer architecture 200 as an exemplary implementation of computer architecture for implementing the various teachings of this disclosure.

The engine 202 is responsible for reading the configuration and instantiating the appropriate implementations based on the identified need. The engine 202 outputs a directory list 204 to a directory scanner 206. The directory scanner 206 will go through each directory and find all the files 208, passing the files 208 on to the parser 210. The parser 210 allows for the switching between various file formats such as plain text or XML. In particular, the parser 210 can read blogs (or other text sources, such as emails, tweets, posts, texts, instant messages, etc.), and can break down the blogs into pieces to be processed (e.g., remove the post from the comments, and break down the comments into various pieces to be processed). The parser 210 outputs documents 212 to one of a number of document processors 214. There is a document processor 214 instantiated for each combination of method and diaculture to be processed (scored), and the document processor(s) 214 is actuated by the engine 202 by a signal 216 to begin/end a run of processing.

Results 218 from the document processor(s) 214 are sent to the recorder 220, which allows for different output options, including writing out results of intermediate steps for debugging purposes. Results 222 of the recorder 220 can be output to the engine 202. The recorder includes a storage medium, such as a hard disk drive or other non-volatile memory for storing data.

The user interface logic 224 is connected to the engine 202, and is provided with, e.g., a display and/or peripherals for a user to provide execute or data input commands 226, and for results 228 to be displayed to a user.

User Interface

The user interface (UI) allows the user to select documents along with the diacultures and methods to score those documents against. Each of these can be modified by selecting or deselecting the various checkboxes. An exemplary UI is shown via the screenshot 300 of FIG. 3.

Figure 3:
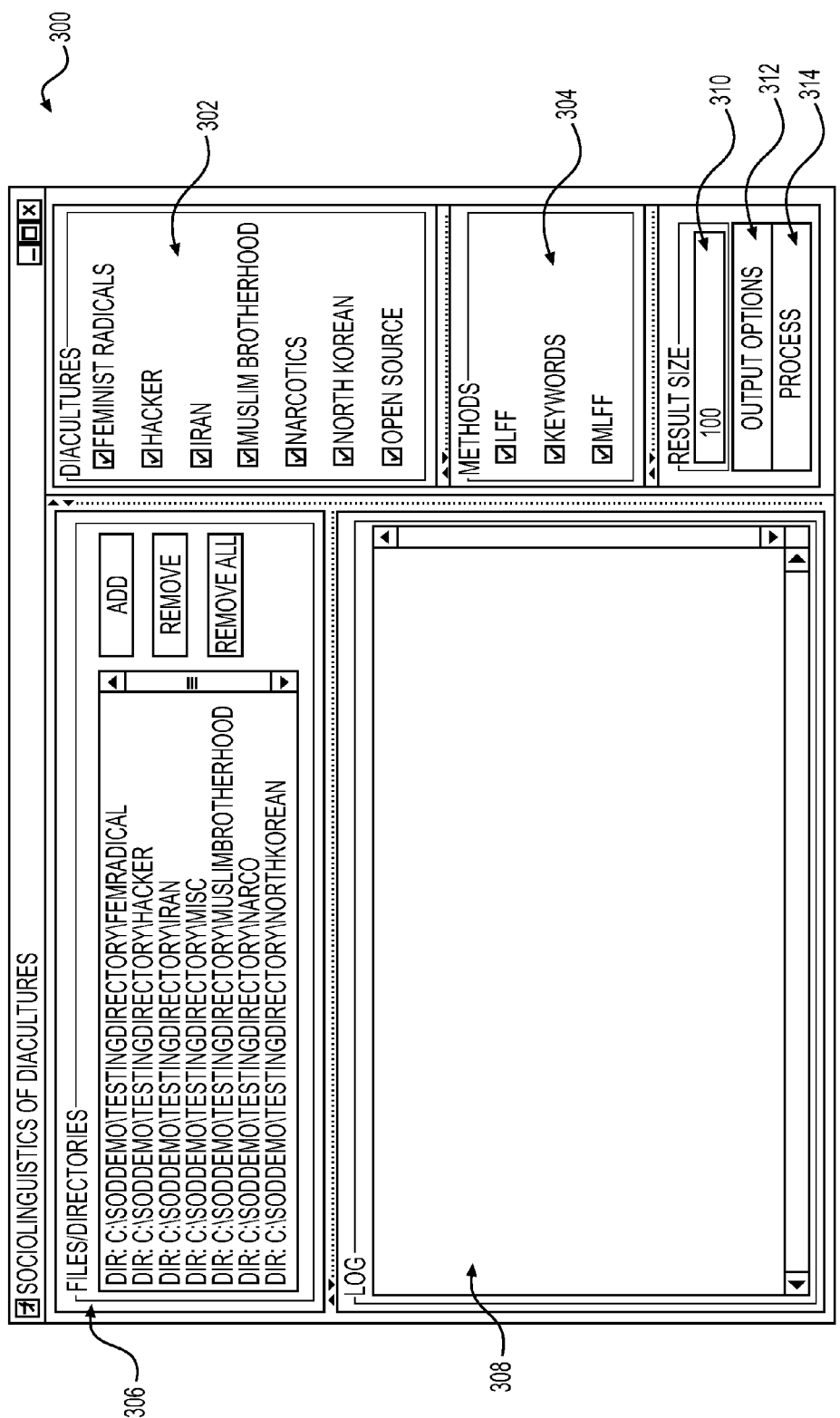

In FIG. 3, the UI includes a checklist 302 of diacultures that can be selected for processing, and a checklist 304 of methods that can be selected for processing. A window 306 is provided to add and remove files/directories that include training and/or baseline data sets. An input interface can also be provided for selecting a particular text to be analyzed to determine its diaculture. A log window 308 can be provided to display a log of processing, which can indicate progress or issues with independent steps. A size of results can be controlled via interface 310, output options (save directory, results display options, results formatting, etc.) can be controlled via interface 312, and the process can be started/stopped via interface 314.

After processing all of the documents, a results screen can be displayed to the user with tabs for each combination of diaculture and method. The display can be split so that the user can compare results side by side. A sample results screen 400 is shown via the screenshot of FIG. 4.

In FIG. 4, the results screen 400 includes an interface 402 to print and save results, and to provide new results or access a main menu. A plurality of tabs 404 are shown for a particular diaculture (e.g., narcotics as illustrated in FIG. 4). Each of the tabs 404 can correspond to a different method and/or diaculture combination. The tabs 404 include other diaculture and method combinations for visibly comparing results between methods and diacultures with results shown in another window 406. The window 406 can show the same results that are able to be shown in the tabs 404, but can be provided with a pull-down interface 408 for selecting a particular result (a diaculture and method combination) that is different than that of a displayed tab 404.

An application programming interface can also be provided that integrates the processing of documents through another application or by other means. An interface can also be provided in which a block of text is passed into the system, and a list of document scores, for each of a plurality of trained diacultures, is returned. Specifically, the scores respectively correspond to each combination of diaculture and method. Consequently, a user is able to view, for a single document or block of text, a score for each combination of method and diaculture, and an assessment can be made as to the diaculture associated therewith.

According to the various implementations discussed herein, several interrelated efforts are combined together because all are based on a basic principle of sociolinguistics, that within groups people talk alike and develop specialized ways of talking to reinforce their sense of belonging and to exclude others, as well as to efficiently communicate ideas that are particular to their own shared experience or goals, and similar high-end language analysis techniques apply these principles to real data.

Although this disclosure pertains to the English language, it should be appreciated that modifications can be implemented to use other languages (and corresponding diacultures).

Further, with a corresponding training set, a plurality of different diacultures can be simultaneously analyzed or analyzed in parallel, and a user can investigate how well a particular text matches various diacultures, according to various scoring methods, at the same time.

The expanded demonstration of capability described herein employs a filtering experiment, in which a key element is the determination of what texts should be discovered, their inclusion in a noise data set, and their separation from the noise via the LFF or MLFF with an F score of 70% or better.

Another experiment is to determine the effectiveness of an application of a keyword filter after the diaculture groups have been separated from the noise. This experiment was performed for the diaculture groups. The experiments show that this two tiered filtering method works more effectively than a keyword filter alone. A keyword search finds blogs that are talking about the words in the keyword list—this could be in news articles or blogs created by any group or diaculture. The LFF and MLFF finds blogs are written by a specific diaculture or group. This method can also be extended to find specific authors. In particular, given an proper training set, with or without appropriate keyword filtering, specific authors can be identified as a very particular diaculture.

As described previously, domain words have been eliminated from the text for the LFF, to focus on the special and often error-prone uses of English from target diacultures. Additionally, the n-gram and phrase scoring methods used by the filter is an advance over traditional methods, particularly in the use of left context to contribute to the scoring of tokens (words), as current methods employ right context. This work can also be extended into other languages.

Adverting back to FIG. 2, the blocks of architecture shown therein can be implemented in a single processing system, or distributed across a plurality of processing systems, which may be referred to as processors. For instance, each of the blocks of architecture can be a discrete processor, system or logic component.

Figure 5:
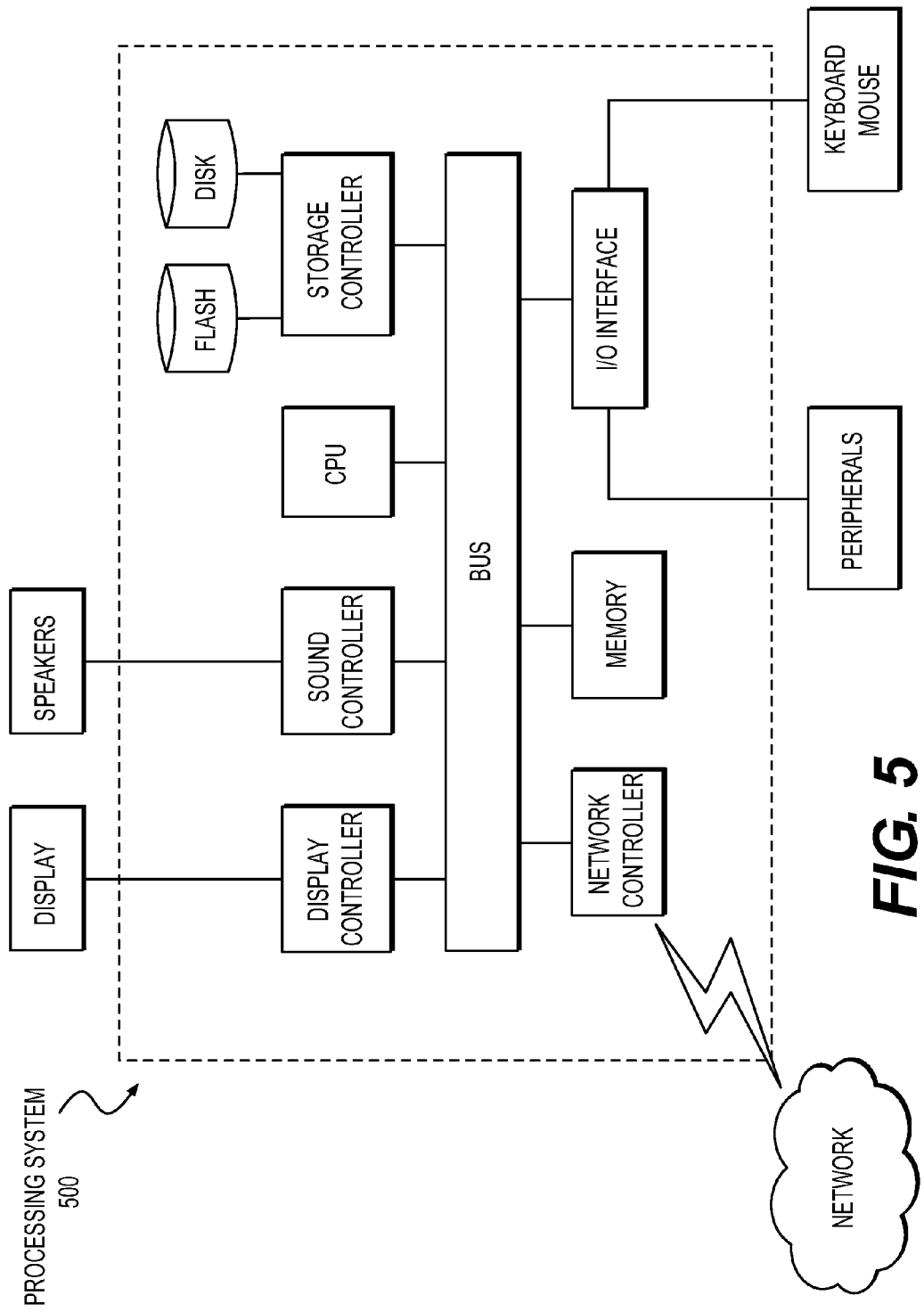
FIG. 5 is a schematic illustration of an exemplary processing system to analyze diacultures of text.

FIG. 5 illustrates an exemplary processing system or processor 500. One or more of such processing systems can be utilized in or to execute one or more algorithms, or portions thereof, or one or more architecture blocks, or portions thereof, in accordance with the descriptions provided herein.

The exemplary processing system 500 can be implemented using one or more microprocessors or the equivalent, such as a central processing unit (CPU) and/or at least one application specific processor ASP (not shown). The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A method for determining a diaculture of text, comprising:
   tokenizing words of the text with one or more processors according to a rule set to generate tokenized text, the rule set defining:
      a first set of grammatical types of words, which are words that are replaced, in the tokenizing, with tokens that respectively indicate a grammatical type of a respective word, and
      a second set of grammatical types of words, which are words that are passed, in the tokenizing, as tokens without changing;
   constructing grams from the tokenized text, each gram including one or more of consecutive tokens from the tokenized text;
   comparing the grams to a training data set that corresponds to a known diaculture to obtain a comparison result that indicates how well the text matches the training data set for the known diaculture, wherein the training data set includes a plurality of comments written by authors of the known diaculture;
   tokenizing words of the comments with one or more processors according to the rule set to generate tokenized comments;
   constructing grams from the tokenized comments, each gram including one or more of consecutive tokens from the tokenized comments;
   assigning scores to each of the grams of the tokenizing comments according to one or more scoring methods that each define a relationship between a score of a gram, and a number of times the gram appears in the training data set and a baseline data set; and
   assigning scores to the grams of the tokenized text based on the scores assigned to the grams of the tokenized comments.

2. The method according to claim 1, wherein the comparing includes:
   assigning scores to the grams based on a comparison between the training data set and a baseline data set;
   windowing a fixed number of the consecutive tokens in the tokenized text to form a first window, and repeatedly advancing the first window by one token to form a plurality of windows of tokens from the tokenized text;
   assigning a score to each of the windows based on the scores assigned to the grams; and
   obtaining the comparison result based on the scores assigned to the windows.

3. The method according to claim 2, wherein the constructing grams includes constructing a plurality of 1, 2, and 3-grams from the tokenized text, the 1, 2, and 3 grams respectively including 1, 2, and 3 consecutive tokens from the tokenized text, such that a 1-gram includes a first token, a 2-gram includes the first token and a second token that consecutively follows the first token, and a 3-gram includes the first and second tokens and a third token that consecutively follows the first token.

4. The method according to claim 3, wherein the comparing includes:
   assigning scores to the grams based on the training data set, including assigning a composite score for one gram that is calculated based on neighboring grams, such that the composite score for the 1-gram is calculated based on scores assigned to the first, second and third tokens.

5. The method according to claim 4, wherein the composite score for the 1-gram is an average of the scores assigned to the first, second and third tokens.

6. The method according to claim 1, wherein the first set of grammatical types of words includes words indicative of a topic of the text.

7. The method according to claim 6, wherein the second set of grammatical types of words does not include words that are indicative of the topic of the text.

8. The method according to claim 1, wherein the first set of grammatical types of words includes verbs, nouns, adverbs, and adjectives.

9. The method according to claim 8, wherein each tense of each grammatical type in the first set is tokenized with a different token.

10. The method according to claim 9, wherein the second set of grammatical types of words includes possessive pronouns, pronouns, articles, and prepositions.

11. The method according to claim 1, wherein the training data set includes a plurality of data sets that respectively correspond to a plurality of different diacultures, and the comparing includes comparing the grams to the data sets to obtain comparison results that indicate how well the text matches the data sets.

12. The method according to claim 11, further comprising displaying a result of the comparing on a display.

13. The method according to claim 1, wherein the comments include comments of a posting, and the training data set does not include the posting.

14. The method according to claim 1, wherein the comparing includes:
    windowing a fixed number of the consecutive tokens in the tokenized text to form a first window, and repeatedly advancing the first window by one token to form a plurality of windows of tokens from the tokenized text;
    assigning scores to the windows based on the scores assigned to the grams; and
    obtaining the comparison result based on the scores assigned to the windows.

15. The method according to claim 14, wherein:
    the training data set includes a plurality of data sets that respectively correspond to a plurality of different diacultures;
    the comparing includes comparing the grams to the data sets to obtain comparison results that indicate how well the text matches the data sets; and
    the method further comprises:
    displaying results of the comparing for each combination of the one or more scoring methods and the different diacultures.

16. A non-transitory computer readable medium including computer-executable instructions that, when executed by a computer processor, cause the computer processor to execute the method according to claim 1.

17. A system for determining a diaculture of text, comprising computer hardware, including a central processor and memory, which is configured to:
    tokenize words of the text with one or more processors according to a rule set to generate tokenized text, the rule set defining:

a first set of grammatical types of words, which are words that are replaced with tokens that respectively indicate a grammatical type of a respective word, and a second set of grammatical types of words, which are words that are passed as tokens without changing;

construct grams from the tokenized text, each gram including one or more of consecutive tokens from the tokenized text; and compare the grams to a training data set that corresponds to a known diaculture to obtain a comparison result that indicates how well the text matches the training data set for the known diaculture, wherein the training data set includes a plurality of comments written by authors of the known diaculture;

tokenizing words of the comments with one or more processors according to the rule set to generate tokenized comments;

constructing grams from the tokenized comments, each gram including one or more of consecutive tokens from the tokenized comments;

assigning scores to each of the grams of the tokenizing comments according to one or more scoring methods that each define a relationship between a score of a gram, and a number of times the gram appears in the training data set and a baseline data set; and assigning scores to the grams of the tokenized text based on the scores assigned to the grams of the tokenized comments.

18. A processing machine for determining a diaculture of text, comprising:

tokenizing circuitry to tokenize words of the text with one or more processors according to a rule set to generate tokenized text, the rule set defining:

a first set of grammatical types of words, which are words that are replaced, by the tokenizing circuitry, with tokens that respectively indicate a grammatical type of a respective word, and a second set of grammatical types of words, which are words that are passed, by the tokenizing circuitry, as tokens without changing;

constructing circuitry to construct grams from the tokenized text, each gram including one or more of consecutive tokens from the tokenized text; and comparing circuitry to compare the grams to a training data set that corresponds to a known diaculture to obtain a comparison result that indicates how well the text matches the training data set for the known diaculture, wherein the training data set includes a plurality of comments written by authors of the known diaculture tokenizing words of the comments with one or more processors according to the rule set to generate tokenized comments;

constructing grams from the tokenized comments, each gram including one or more of consecutive tokens from the tokenized comments;

assigning scores to each of the grams of the tokenizing comments according to one or more scoring methods that each define a relationship between a score of a gram, and a number of times the gram appears in the training data set and a baseline data set; and assigning scores to the grains of the tokenized text based on the scores assigned to the grams of the tokenized comments.

* * * * *